United States Patent
Howard et al.

(10) Patent No.: US 6,513,006 B2
(45) Date of Patent: *Jan. 28, 2003

(54) AUTOMATIC CONTROL OF HOUSEHOLD ACTIVITY USING SPEECH RECOGNITION AND NATURAL LANGUAGE

(75) Inventors: John Howard, Saratoga, CA (US); Jean-Claude Junqua, Santa Barbara, CA (US)

(73) Assignee: Matsushita Electronic Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/875,740

(22) Filed: Jun. 6, 2001

(65) Prior Publication Data

US 2001/0041980 A1 Nov. 15, 2001

Related U.S. Application Data

(63) Continuation-in-part of application No. 09/383,758, filed on Aug. 26, 1999.

(51) Int. Cl.[7] .................. G10L 15/18; G10L 21/06; G06F 17/21
(52) U.S. Cl. .................. 704/257; 704/275; 704/10
(58) Field of Search ..................... 704/270.1, 275, 704/246

(56) References Cited

U.S. PATENT DOCUMENTS

| | | | |
|---|---|---|---|
| 5,832,439 A | * 11/1998 | Cox, Jr. et al. | 704/275 |
| 5,890,123 A | * 3/1999 | Brown et al. | 704/270.1 |
| 5,893,064 A | * 4/1999 | Kudirka et al. | 704/270.1 |
| 6,133,909 A | * 10/2000 | Schein et al. | 345/327 |
| 6,199,034 B1 | * 3/2001 | Wical | 704/9 |
| 6,199,067 B1 | * 3/2001 | Geller | 704/247 |
| 6,236,395 B1 | * 5/2001 | Sezan et al. | 345/328 |
| 6,314,398 B1 | * 11/2001 | Junqua et al. | 704/275 |
| 6,324,512 B1 | * 11/2001 | Junqua et al. | 704/275 |

OTHER PUBLICATIONS

Shaban ("Using Shared–Packed Forests In A GB Parser", Sixth International Conference on Tools with Artificial Intelligence, Nov. 1994).*

Ferro et al (Proceedings of the 1994 International Conference on Computer Languages, May 1994).*

Chun–Hsien et al ("A Neural–Network Architecture For Syntax Analysis", IEEE Transactions on Neural Networks, Jan. 1999.*

Karn ("Design And Evaluation Of A Phonological Phrase Parser For Spanish Text–To–Speech", Fourth International Conference on Spoken Language, Oct. 1996).*

Mckay, "Tech Home: When HAL Met Sally"Washington Post article, Jan. 25, 1999.*

Romano, "Computers That Tend The Home", New York Times article, Mar. 15, 1998.*

* cited by examiner

*Primary Examiner*—Richemond Dorvil
*Assistant Examiner*—Daniel Nolan
(74) *Attorney, Agent, or Firm*—Harness, Dickey & Pierce, P.L.C.

(57) ABSTRACT

Speech recognition and natural language parsing components are used to extract the meaning of the user's spoken input. The system stores a semantic representation of an electronic activity guide, and the contents of the guide can be mapped into the grammars used by the natural language parser. Thus, when the user wishes to navigate through the complex menu structure of the electronic activity guide, he or she only needs to speak in natural language sentences. The system automatically filters the contents of the guide and supplies the user with on-screen display or synthesized speech responses to the user's request. The system allows the user to communicate in a natural way with a variety of devices communicating with the home network or home gateway.

17 Claims, 4 Drawing Sheets

AUTOMATIC CONTROL OF HOUSEHOLD ACTIVITY USING SPEECH RECOGNITION AND NATURAL LANGUAGE

CROSS-REFERENCE TO RELATED APPLICATIONS

This application is a continuation-in-part of U.S. patent application Ser. No. 09/383,758 filed on Aug. 26, 1999, entitled "Automatic Filtering of TV Contents Using Speech Recognition and Natural Language."

BACKGROUND OF THE INVENTION

The present invention relates generally to interactive information retrieval. More particularly, the invention relates to a speech-enabled system for navigating through a menu structure of electronically stored information so that an optimal amount and proper content of information may be displayed to the user.

There is growing interest in expanding the reach of computer networks throughout the home. Home gateways are being developed to provide networking services, home automation and information access throughout the home. One of the problems associated with providing such access is information retrieval. Whereas large computer displays do a reasonably good job of displaying information in a convenient to use, well-organized format, many appliances and systems within the home do not have displays of this size or quality. Thus most consumer electronic products and appliances have heretofore been capable of displaying only simple messages and small quantities of information.

In the future, with the growth of home networks, it is anticipated that users will want to connect various consumer electronic products and home appliances to the home network, allowing such products and appliances to share data and interact with one another. In this regard, the home network may support communication over a variety of channels, including over existing telephone wiring or computer network wiring, as data signals superimposed upon the AC power lines, or as wireless communications using a variety of different technologies including spread spectrum radio frequency and bluetooth technology.

Once the home network is constructed and a variety of different electronic products and appliances are connected, users will undoubtedly wish to use their connected products and appliances as portals to the home network. The problem with this is that current technology provides a very cumbersome user interface, particularly where display size is small or of low quality. With current technology it can sometimes take a long time for information on a menu to be displayed to the user. Moreover, interacting with on-screen menu displays is cumbersome, particularly where mouse activity or keyboard operation must be performed in darkened rooms. Finally, the user interface screen may not be located in an ideal place for all members of the family, and there may be a limited number of such interfaces.

SUMMARY OF THE INVENTION

The present invention provides a speech-enabled system for filtering information and for navigating through complex menu structures with the assistance of one or more electronic activity guides. The system can be configured to present an optimal amount of information to the user for subsequent activity selection.

To deal with the limitations of conventional screen-based interfaces, the present invention uses speech recognition and natural language parsing to automatically filter the contents of the electronic activity guide, so that an optimal number of fine-tuned selections can be displayed to the user for subsequent selection by voice or through conventional push-button control or by other means.

The invention provides a fast and far less intrusive interface for a user in selecting a particular activity. Often it is possible to complete a request in a single sentence. In this case, there is no need for a display device, or no need to look at one if it is provided.

The invention makes it possible for any device connected to the network to serve as a portal for operating that device or any other device connected to the network. If the network is coupled through a gateway or other suitable connection to the Internet, then the Internet is also accessible through this portal.

The invention employs a speech recognition system having a parser for extracting semantic information from a user's input speech. A data store stores a representation of one or more electronic activity guides. These guides have the capability of limiting the natural language dialog domain to a particular device, system or discourse. This makes the system far more accurate in interpreting the meaning associated with the user's input speech. A natural language dialog module accesses the electronic activity guide or guides, interprets the meaning of the user's input speech and provides appropriate information to the network to retrieve specific information from any of the devices connected to the network, or from the Internet if a connection thereto is provided. The natural language dialog module is also able to provide control commands and menu navigation commands to devices communicating over the network. Thus the invention gives the user a natural, speaking mode of obtaining information and controlling equipment, appliances, computers and other systems throughout the home.

By way of example, the user, about ready to make a shopping trip, might speak into a microphone associated with the refrigerator and ask, "What can I make for dinner?" The natural language dialog module would access the appropriate electronic activity guide (the one associated with the refrigerator) and then retrieve information that associates possible dinner menus with items in the refrigerator. The system would make suggestions about possible menus, alerting the user to ingredients that may need to be acquired. The user could then say, "I think I will make chicken stew tonight. Please print me a shopping list." The system would then ascertain which items are not currently found in the refrigerator and would send a print job to the user's computer for printing.

In one preferred implementation each appliance or other device communicating over the network has an associated electronic activity guide that conforms the dialog grammar to its particular domain. The natural language dialog module may be a shared across the network. When the user speaks into a microphone attached to or in proximity to an appliance or device communicating over the network, the natural language dialog module interprets the meaning of the input speech using the electronic activity guide, and thus the specific grammar, that is most appropriate to the input speech. The system chooses the best activity guide by identifying the grammar that gives the highest semantic recognition score. Thus, the user could stand in front of the refrigerator portal and ask the system to look up stock process on the Internet for playback over the refrigerator's speaker using the system's text-to-speech synthesizer. The natural language dialog module would interpret requests for stock prices using an electronic activity guide associated with the home gateway connected to the Internet, for example, even though the user entered the input speech through a microphone associated with or in proximity to the refrigerator.

For a more complete understanding of the invention and its many capabilities, objects and advantages, refer to the remaining specification and to the accompanying drawings.

DESCRIPTION OF THE PREFERRED EMBODIMENT

Figure 1:
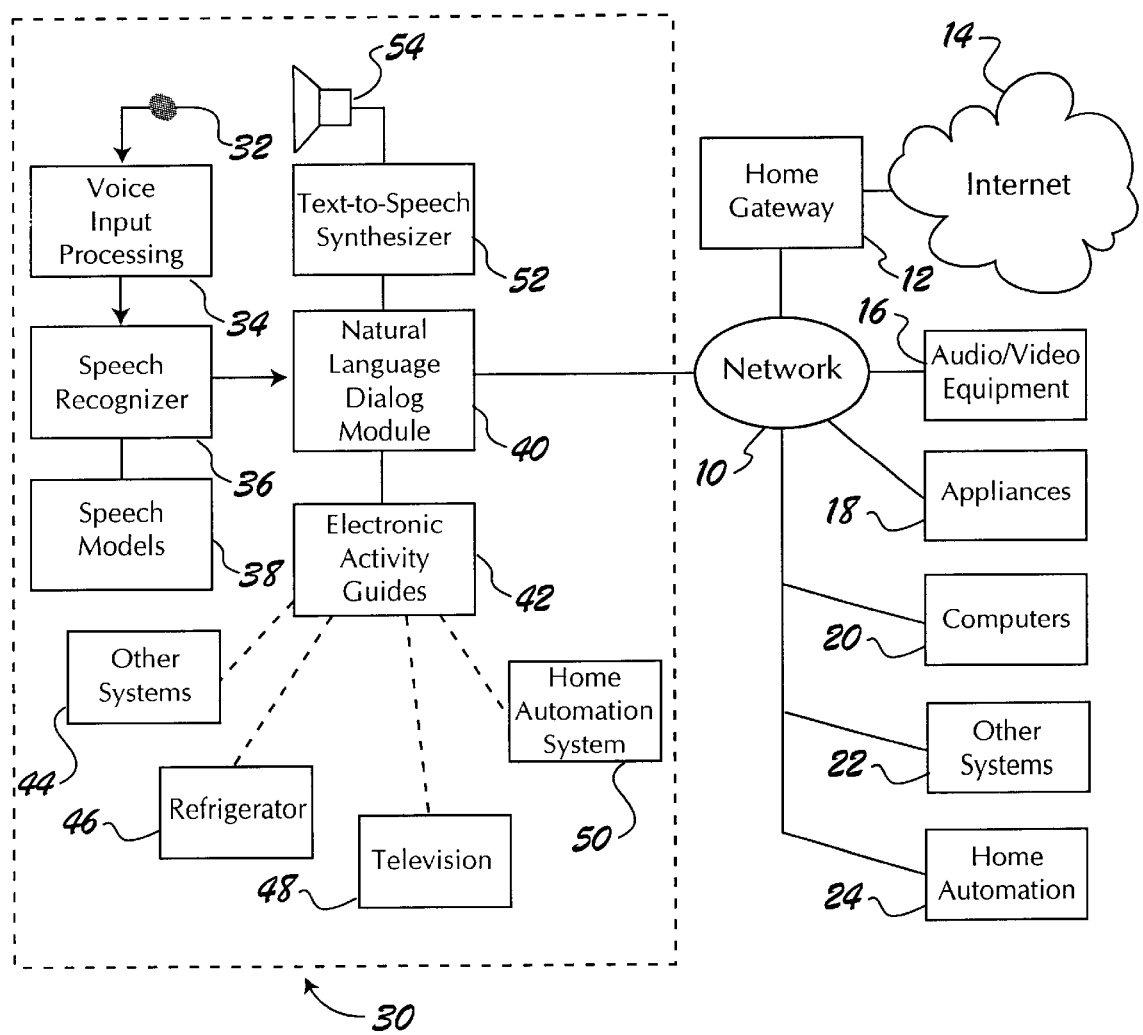
FIG. 1 is a block diagram of a presently preferred embodiment of the invention, shown in conjunction with a computer network and home gateway coupled to the Internet.

Referring to FIG. 1, the household activity control system is shown as an integral component of a computer network 10, which may include a gateway 12 that connects to the Internet 14 through suitable connection. As previously noted, the network 10 can be implemented over a variety of different communication technologies, including wired and wireless technologies and optical technologies.

For purposes of illustrating some of the capabilities of the invention, a variety of devices are illustrated as attached to network 10. These include audio/video equipment 16, appliances 18, computers 20 and other systems 22. In this regard, at the present time most homes are not equipped with audio/video equipment and appliances that are network-enabled. However, it is anticipated that future audio/video equipment and home appliances will include networking capability, allowing these devices to serve as components under control of the home gateway and network system and also as portals for natural language communication.

The gateway 12 can take a variety of different forms, ranging from a simple network hub device to a more complex hub and switching system with broadband connection to the Internet 14. If desired, the gateway can also include components for performing a variety of home automation functions, including lighting control functions, fire and burglar alarm functions, heating and cooling system control functions, telephone answering and switching functions, and the like. Alternatively, these home automation functions can be provided by auxiliary equipment connected to the network as illustrated at 24.

Preferably each of the devices connected to network 10, such as the devices illustrated at 16–24 in FIG. 1, has independent processing capability and at least some limited data storage ability. Also, these devices may include integral display screens, user input controls, such as pushbutton controls, pointing device controls, keyboards and the like. In the presently preferred embodiment each device is configured to work independent of its connection to the network. Thus if the network is taken out of service for some reason, the devices will still perform their respective functions. When the network is thereafter placed back into service the devices are preferably capable of communicating with each other to update each other on conditions that may have been recorded when they were out of communication.

In accordance with the present invention a speech recognition and natural language dialog system is provided to allow users to communicate with the various equipment and systems attached to the network using natural language speech. For purposes of illustration, the speech recognition and natural language dialog system has been illustrated at 30. The system 30 is shown as being connected to network 10 in FIG. 1. This is intended merely to demonstrate that the speech recognition and natural language dialog processing services of system 30 are made available to the equipment, appliances and other systems communicating over network 10. Thus the system 30 could be physically implemented within the home gateway 12, or within any of the other pieces of equipment, appliances, computers, automation systems and other systems communicating over the network. In addition, or alternatively, the functionality provided by system 30 could be implemented by components obtained from the Internet 14. The components might be downloaded, for example, into the home gateway 12 from the Internet 14 on demand.

The speech recognizing and natural language processing system 30 of the preferred embodiment includes one of more microphones 32 through which the input speech is provided. These may be noise-canceling microphones and may be physically deployed in a variety of locations, including within any of the components communicating over network 10. The microphone input is supplied to a voice input processing module 34 which digitizes the input speech and converts it into the form required by the speech recognizer 36. Because home environments typically have a great deal of spurious background noise, the voice input processing module 34 may include processing components to detect the beginning and ending of speech, thereby screening out background noise components that do not meet a human speech profile.

The speech recognizer 36 may include a set of speech models 38 that are trained or adapted in advance and are used by the recognizer to convert the spoken utterances into text form or symbolic form. In one embodiment the speech models 38 can be speaker-independent, continuous speech models capable of converting a large vocabulary of words and phrases into text or symbolic form. If desired, the system can be made capable of updating the speech models 38 based on training or adaptation utterances from the speakers who will be using the system. In such case, the speech models would be modified into speaker-dependent/adapted models.

The output of speech recognizer 36 is fed to the natural language dialog module 40. The construction and operation of this module will be described more fully below. The natural language dialog module works in conjunction with a set of electronic activity guides shown collectively at 42 and individually at 44, 46, 48 and 50. As will be more fully explained, these electronic activity guides serve to limit the domain of the natural language dialog module, allowing it to extract semantic content or meaning from the text or symbolic representation supplied to the dialog module by the speech recognizer 36. While it is possible to construct a global electronic activity guide that is capable of handling dialogs with a wide variety of different components, equipment, appliances, systems and the like, the presently preferred implementation uses separate electronic activity guides for these respective pieces of equipment. Separating the electronic activity guides for each piece of equipment makes programming and troubleshooting of the guides easier when designing a system.

The natural language dialog module may be coupled to a text-to-speech synthesizer 52 that is in turn coupled to a suitable audio system having speakers as illustrated diagrammatically at 54. The text-to-speech synthesizer provides voice prompts as part of the natural language dialog with the user. The text-to-speech synthesizer 52 can also playback text content in an audible, synthesized speech form so that the user can acquire information without the need to look at a display screen. The natural language dialog module ascertains the semantic content or meaning of the user's input speech and provides suitable commands to the corresponding equipment communicating over network 10.

Figure 2:
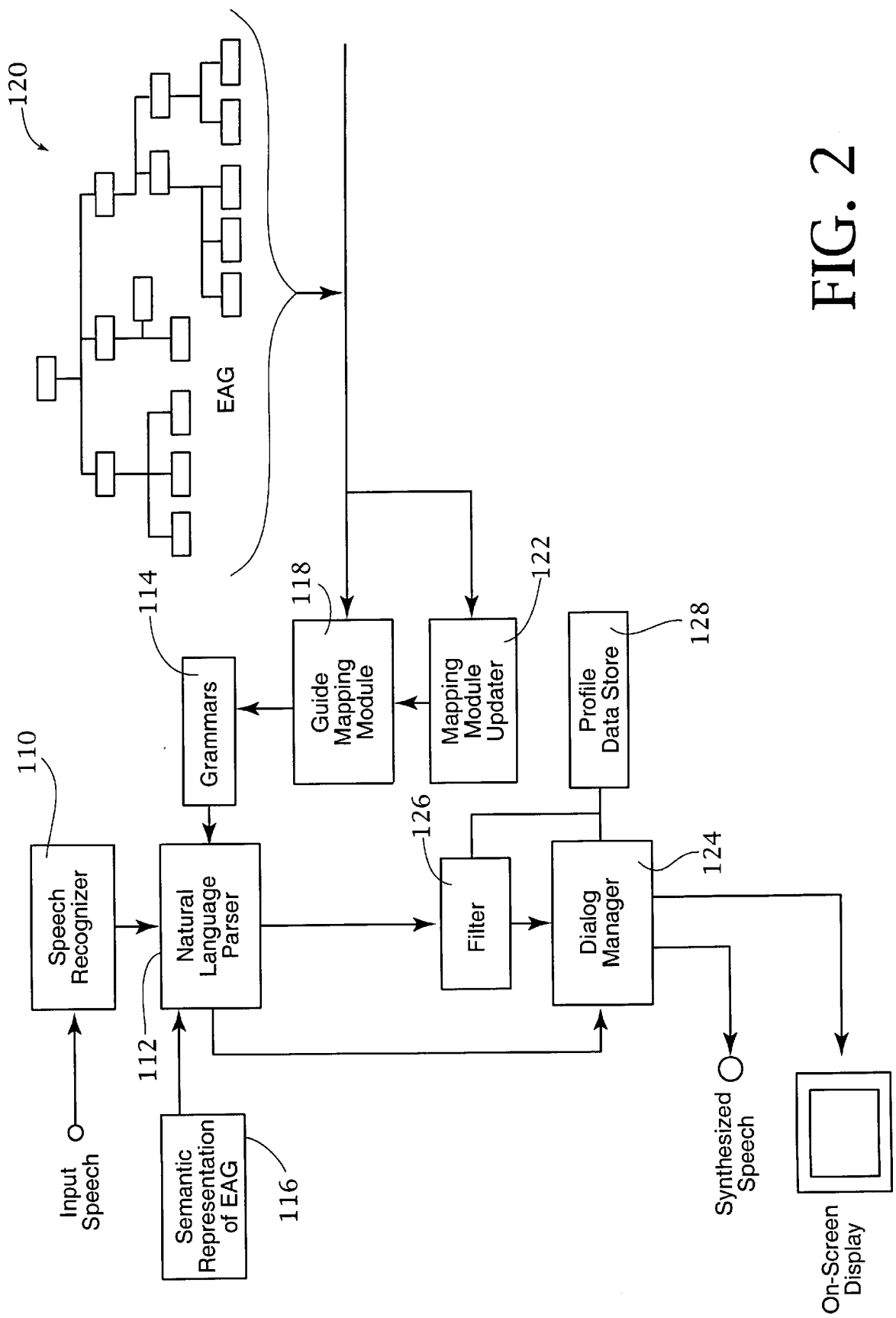
FIG. 2 is a more detailed block diagram illustrating how the speech recognizer and natural language parser interact with the dialog manager and the associated electronic activity guides.

A presently preferred embodiment of the recognition and natural language system is illustrated in FIG. 2. Input speech from the user is supplied through suitable audio interface and digitizer to the speech recognizer module 110. The output of speech recognizer module 110 is supplied to a natural language parser 112. The parser works in conjunction with a set of grammars 114 that define the semantics of what the parser can understand. The details of the parser are discussed more fully below. Essentially, however, the parser operates on a goal-oriented basis, identifying keywords and phrases from the recognized speech and using those recognized words and phrases to fill slots in pre-defined templates or frames that represent different goal-oriented tasks.

The parser also works in conjunction with a semantic representation of the electronic activity guide (EAG). In FIG. 2, the semantic representation is stored at 116. The EAG is mapped into the grammars 114. The natural language parser thus consults the semantic representation stored at 116 to determine what options or responses the system will present to the user. Because the system allows the user to interact with ever-changing electronic activity guide data, a mechanism is provided for downloading or updating the electronic activity guide contents into the grammars of the local parser. This function is performed by the guide-mapping module 118. The mapping module downloads the EAG, illustrated diagrammatically as a tree structure at 120, and maps the guide's contents into the grammars of the local parser. The guide-mapping module has a prioi knowledge of the overall structure of the electronic activity guide. Thus the mapping module would be aware, for example, that the electronic activity guide associated with a television or video recorder has separate categories for movies, sports, news, weather, and so forth. The mapping module then uses this a priori knowledge in mapping the information found at the intermediate and leaf nodes of the electronic activity guide into the grammars. For example, the semantic representation corresponding to movies might, in turn, have slots corresponding to different types of movies, such as comedies, dramas, science fiction, slots for the director's name, for the actors names, and so forth. A semantic representation of the contents of the refrigerator might have slots corresponding to different types of food items, for example.

From time to time, the overall structure of the electronic activity guide may change. This may happen, for example, when new components are added to the network. The system is constructed to accommodate such change by including a mapping module update 122. The module update can be supplied with update information over the network, over the Internet, or over any other telecommunication link. If the overall structure of the electronic activity guide changes, such that the program guide-mapping module will no longer correctly map all of the guide's contents, the mapping module is updated by update 122. The update can be in the form of additional plug-in modules, or an entirely new version of the mapping module.

One objective of the system is to simplify the interaction with the devices communicating over the network. The system does this by filtering the information found in the electronic activity guide, based on the semantics of the user's spoken request. While in some cases, dialog with the user can quickly identify a single activity or item of information the user is interested in, more often a series of dialogs may be needed to hone in on what the user is interested in doing.

To facilitate this, the preferred embodiment employs a dialog manager 124 that uses natural language parser 112 to refine the user's requests to something that can be meaningfully displayed on a screen or presented through synthesized speech. The dialog manager has pre-stored information about the display capabilities of the system, so that it can determine what is an appropriate quantity of information to provide to the user on screen. For example, presenting the user with fifty movie options in response to a single request might be too many to readily display on the screen, given the limitations of the screen resolution and font height. On the other hand, if only two programs are identified responsive to a given request, the dialog manager may engage the user with additional queries to determine whether the user would like to see more information.

By virtue of using a semantic representation of the electronic activity guide, the system performs a filtering of the information contained in the electronic program guide 120. This function is depicted diagrammatically by filter module 126 in FIG. 2.

The dialog manager works in conjunction with a profile data store 128. This data store may contain user profile information, such as data on what the user has previously requested. This information can be used, for example, to guide the dialog manager and the associated filtering function in identifying information the user may or may not be interested in. For example, if the user viewed a particular program on a previous night, that fact would be recorded in the data store 128 and the dialog manager could then suppress this program for display on a subsequent night. Similarly, if the user regularly rejects a dinner selection of spinach stew, the dialog manager will suppress this selection in the future. The profile data store can also be used to store user preferences about how much information the user wishes to have displayed on screen, or supplied by synthesized speech. The profile data for a particular user may be selected using speaker verification or speaker identification. In this regard, the recognition system stores unique or identifying speech characteristics of each user. Thereafter, when that user provides input speech, the system can either ascertain the identity of the speaker by performing speaker identification based on the speech characteristics, or verify a given identity provided by the speaker by performing speaker verification based on the speech characteristics.

The natural language parser 112 together with the semantic representation of the electronic activity guide forms the heart of the speech understanding system. The details of the preferred natural language parser will now be described.

Figure 3:
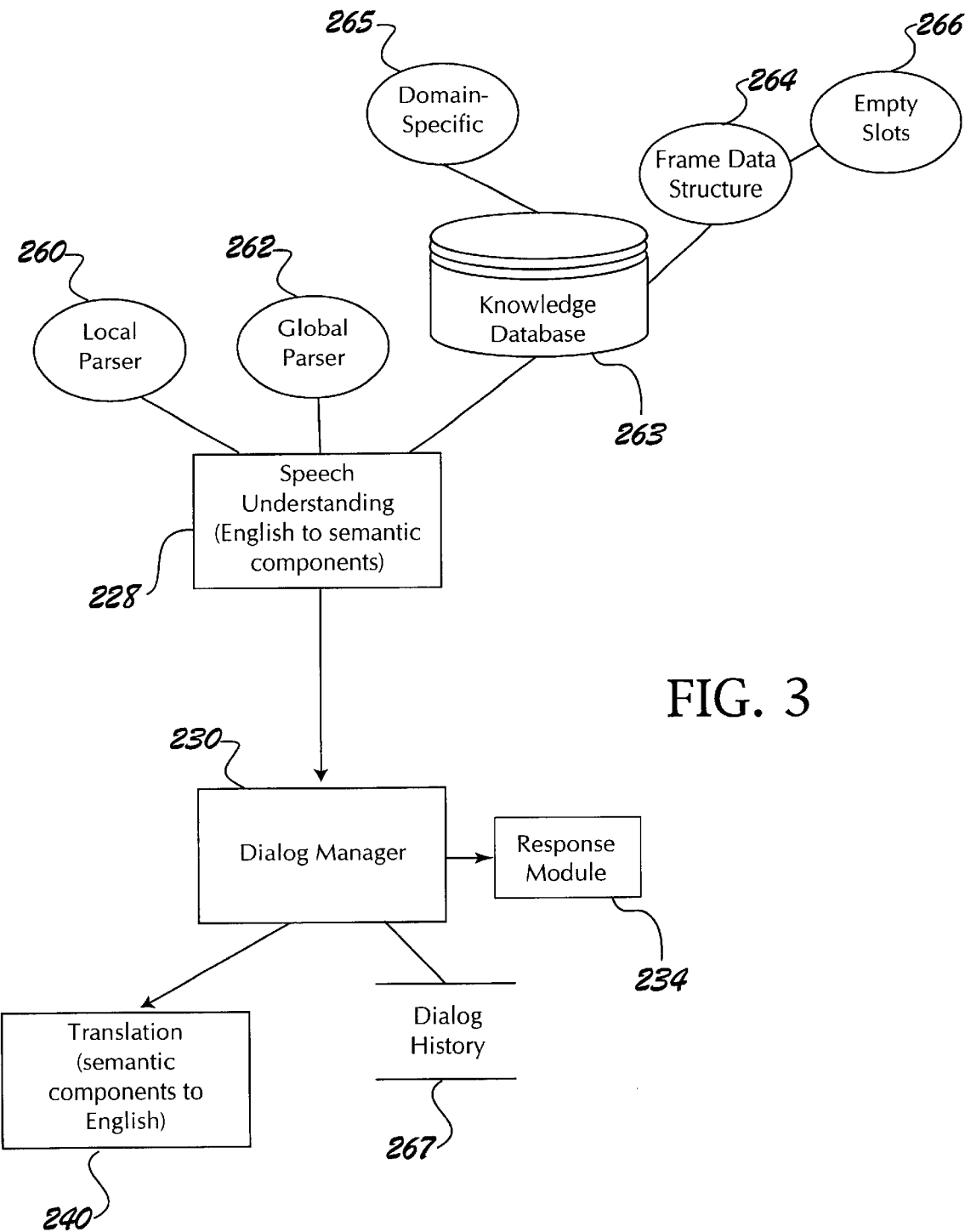
FIG. 3 is a block diagram depicting the components of the natural language parser of the presently preferred embodiment.

FIG. 3 depicts components of the natural language parser 112 in more detail. In particular, speech understanding module 228 includes a local parser 260 to identify predetermined relevant task-related fragments. Speech understanding module 228 also includes a global parser 262 to extract the overall semantics of the speaker's request.

The local parser 260 utilizes in the preferred embodiment small and multiple grammars along with several passes and a unique scoring mechanism to provide parse hypotheses.

For example, the novel local parser 260 recognizes according to this approach phrases such as dates, names of people, movie categories, food categories and the like. If a speaker utters to the home entertainment system, "Record me a comedy in which Mel Brooks stars and is shown before January 23rd", the local parser recognizes: "comedy" as being a movie category; "January 23rd" as a date; and "Mel Brooks" as an actor. The global parser assembles those items (movie category, date, etc.) together and recognizes that the speaker wishes to record a movie with certain constraints.

Speech understanding module 228 includes knowledge database 263 which encodes the semantics of a domain (i.e., goal to be achieved). In this sense, knowledge database 263 is preferably a domain-specific database as depicted by reference numeral 265 and is used by dialog manager 230 to determine whether a particular action related to achieving a predetermined goal is possible.

The preferred embodiment encodes the semantics via a frame data structure 264. The frame data structure 264 contains empty slots 266 which are filled when the semantic interpretation of global parser 262 matches the frame. For example, a frame data structure (whose domain is tuner commands) includes an empty slot for specifying the viewer-requested channel for a time period. If the viewer has provided the channel, then that empty slot is filled with that information. However, if that particular frame needs to be filled after the viewer has initially provided its request, then dialog manager 230 instructs response module 234 to ask the viewer to provide a desired channel. The response module 234 may include a text-to-speech synthesizer.

The frame data structure 264 preferably includes multiple frames, which each in turn have multiple slots. In the television-tuning example, one frame may have slots directed to attributes of a movie, director, and type of movie. Another frame may have slots directed to attributes associated with the location to which the movie is playing, the channel, and so forth.

The following reference discusses global parsers and frames: R. Kuhn and R. D. Mori, *Spoken Dialogues with Computers* (Chapter 14: Sentence Interpretation), Academic Press, Boston (1998).

Dialog manager 230 uses dialog history data file 267 to assist in filling in empty slots before asking the speaker for the information. Dialog history data file 267 contains a log of the conversation, which has occurred through the device of the present invention. For example, the speaker indicates that he or she will be having four persons for dinner tonight. The dialog manager 230 would store in the dialog history data file 267 a record of the number of persons. Thereafter, if the speaker utters, "I" d like to cook on the barbecue tonight, "the dialog manager 230 examines the database associated with the refrigerator to determine what items are available. Using the dialog history data file 267 the dialog manager 230 may recommend "pork chops" because there are four pork chops available. Based on the dialog history, the dialog manager would not recommend chicken, if there is only one serving available. If a sufficient number of slots have been filled, then the present invention will ask the speaker to verify and confirm the menu selection. Thus, if any assumptions made by the dialog manager 230 through the use of dialog history data file 267 prove to be incorrect, then the speaker can correct the assumption.

The natural language parser 112 analyzes and extracts semantically important and meaningful topics from a loosely structured, natural language text which may have been generated as the output of an automatic speech recognition system (ASR) used by a dialog or speech understanding system. The natural language parser 112 translates the natural language text input 240 to a new representation by generating well-structured tags containing topic information and data, and associating each tag with the segments of the input text containing the tagged information. In addition, tags may be generated in other forms such as a separate list, or as a semantic frame.

Robustness is a feature of the natural language parser 112 as the input can contain grammatically incorrect English sentences, due to the following reasons: the input to the recognizer is casual, dialog style, natural speech can contain broken sentences, partial phrases, and the insertion, omission, or mis-recognition of errors by the speech recognizer even when the speech input is considered correct. The natural language parser 112 deals robustly with all types of input and extracts as much information as possible. While the English language is illustrated here, the invention can be implemented for any language.

Figure 4:
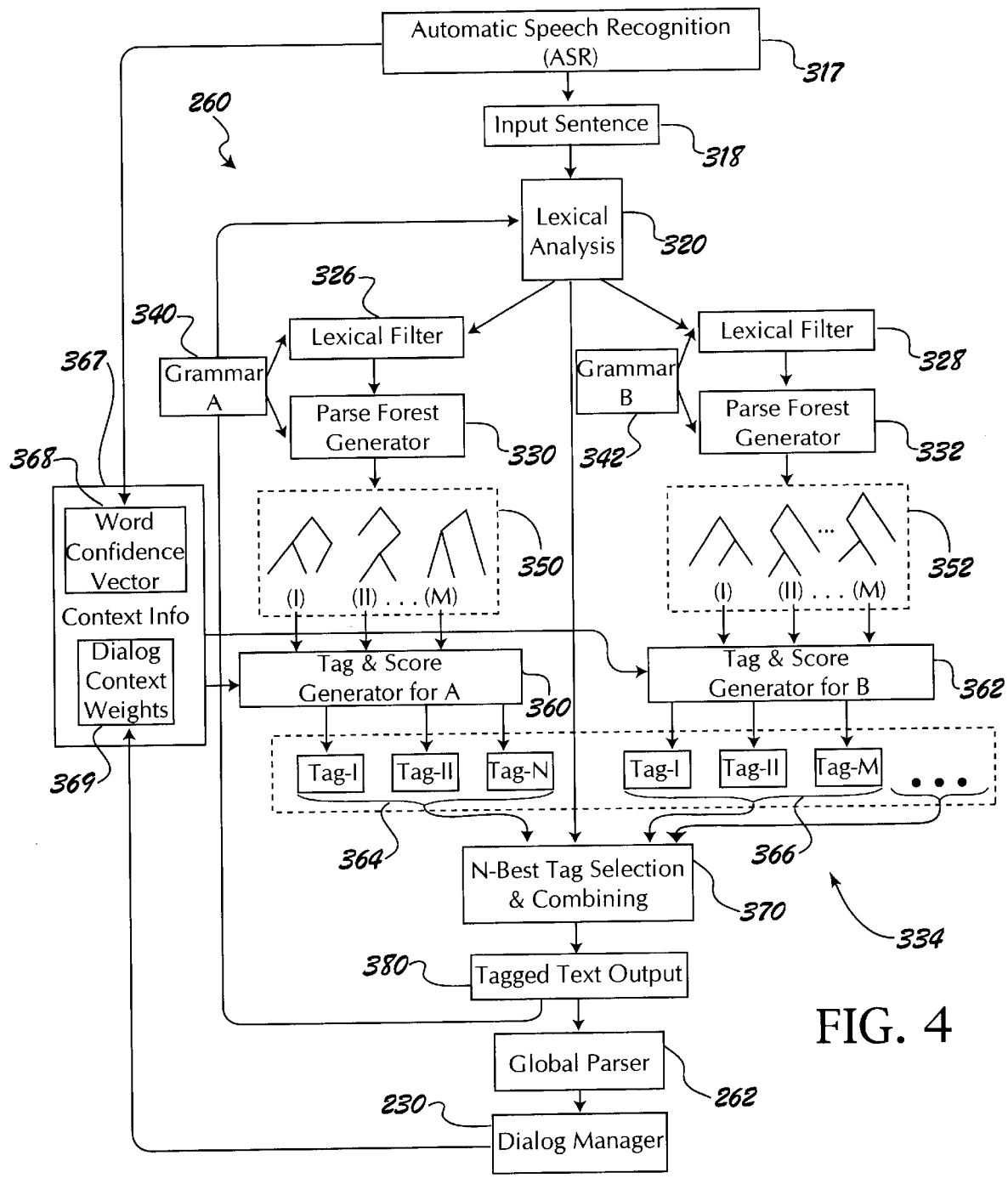
FIG. 4 is a block diagram depicting the components of the local parser of the presently preferred embodiment.

FIG. 4 depicts the different components of the novel local parser 260 of the natural language parser 112. The natural language parser 112 preferably utilizes generalized parsing techniques in a multi-pass approach as a fixed-point computation. Each topic is described as a context-sensitive LR (left-right and rightmost derivation) grammar, allowing ambiguities. The following are references related to context-sensitive LR grammars: A. Aho and J. D. Ullman, *Principles of Compiler Design*, Addison Wesley Publishing Co., Reading, Mass. (1977); and N. Tomita, Generalized LR Parsing, Kluwer Academic Publishers, Boston, Mass. (1991).

At each pass of the computation, a generalized parsing algorithm is used to generate preferably all possible (both complete and partial) parse trees independently for each targeted topic. Each pass potentially generates several alternative parse-trees, each parse-tree representing a possibly different interpretation of a particular topic. The multiple passes through preferably parallel and independent paths result in a substantial elimination of ambiguities and overlap among different topics. The generalized parsing algorithm is a systematic way of scoring all possible parse-trees so that the (N) best candidates are selected utilizing the contextual information present in the system.

Local parsing system 260 is carried out in three stages: lexical analysis 320; parallel parse-forest generation for each topic (for example, generators 330 and 332); and analysis and synthesis of parsed components as shown generally by reference numeral 334.

Lexical Analysis:

A speaker utters a phrase that is recognized by an automatic speech recognizer 317 which generates input sentence 318. Lexical analysis stage 320 identifies and generates tags for the topics (which do not require extensive grammars) in input sentence 318 using lexical filters 326 and 328. These include, in the home entertainment application for example, movie names; category of movie; producers; names of actors and actresses. A regular-expression scan of the input sentence 318 using the keywords involved in the mentioned exemplary tags is typically sufficient at this level. Also, performed at this stage is the tagging of words in the input sentence that are not part of the lexicon of particular grammar. These words are indicated using an X-tag so that such noise words are replaced with the letter "X".

Parallel Parse-forest Generation:

The parser 112 uses a high-level general parsing strategy to describe and parse each topic separately, and generates tags and maps them to the input stream. Due to the nature of unstructured input text 318, each individual topic parser preferably accepts as large a language as possible, ignoring all but important words, dealing with insertion and deletion errors. The parsing of each topic involves designing context-sensitive grammar rules using a meta-level specification language, much like the ones used in LR parsing. Examples of grammars include grammar A 340 and grammar B 342. Using the present invention's approach, topic grammars 340 and 342 are described as if they were an LR-type grammar, containing redundancies and without eliminating shift and reduce conflicts. The result of parsing an input sentence is all possible parses based on the grammar specifications.

Generators 330 and 332 generate parse forests 350 and 352 for their topics. Tag-generation is done by synthesizing actual information found in the parse tree obtained during parsing. Tag generation is accomplished via tag and score generators 360 and 362 which respectively generate tags 364 and 366. Each identified tag also carries information about what set of input words in the input sentence are covered by the tag. Subsequently the tag replaces its cover-set. In the preferred embodiment, context information 367 is utilized for tag and score generations, such as by generators 360 and 362. Context information 367 is utilized in the scoring heuristics for adjusting weights associated with a heuristic scoring factor technique that is discussed below. Context information 367 preferably includes word confidence vector 368 and dialogue context weights 369. However, it should be understood that the parser 112 is not limited to using both word confidence vector 368 and dialogue context weights 369, but also includes using one to the exclusion of the other, as well as not utilizing context information 367.

Automatic speech recognition process block 317 generates word confidence vector 368, which indicates how well the words in input sentence 318 were recognized. Dialog manager 230 generates dialogue context weights 369 by determining the state of the dialogue. For example, dialog manager 230 asks a user about a particular topic, such as, what viewing time is preferable. Due to this request, dialog manager 230 determines that the state of the dialogue is time-oriented. Dialog manager 230 provides dialogue context weights 369 in order to inform the proper processes to more heavily weight the detected time-oriented words.

Synthesis of Tag-components:

The topic spotting parser of the previous stage generates a significant amount of information that needs to be analyzed and combined together to form the final output of the local parser. The parser 112 is preferably as "aggressive" as possible in spotting each topic resulting in the generation of multiple tag candidates. Additionally in the presence of numbers or certain keywords, such as "between", "before", "and", "or", "around", etc., and especially if these words have been introduced or dropped due to recognition errors it is possible to construct many alternative tag candidates. For example, an input sentence could have insertion or deletion errors. The combining phase determines which tags form a more meaningful interpretation of the input. The parser 112 defines heuristics and makes a selection based on them using an N-Best candidate selection process. Each generated tag corresponds to a set of words in the input word string, called the tag's cover-set.

A heuristic is used that takes into account the cover-sets of the tags used to generate a score. The score roughly depends on the size of the cover-set, the sizes in the number of the words of the gaps within the covered items, and the weights assigned to the presence of certain keywords. In the preferred embodiment, ASR-derived confidence vector and dialog context information are utilized to assign priorities to the tags. For example applying channel-tags parsing first potentially removes channel-related numbers that are easier to identify uniquely from the input stream, and leaves fewer numbers to create ambiguities with other tags. Preferably, dialog context information is used to adjust the priorities.

N-Best Candidates Selection

At the end of each pass, an N-best processor 370 selects the N-best candidates based upon the scores associated with the tags and generates the topic-tags, each representing the information found in the corresponding parse-tree. Once topics have been discovered this way, the corresponding words in the input can be substituted with the tag information. This substitution transformation eliminates the corresponding words from the current input text. The output 380 of each pass is fed-back to the next pass as the new input, since the substitutions may help in the elimination of certain ambiguities among competing grammars or help generate better parse-trees by filtering out overlapping symbols.

Computation ceases when no additional tags are generated in the last pass. The output of the final pass becomes the output of the local parser to global parser 262. Since each phase can only reduce the number of words in its input and the length of the input text is finite, the number of passes in the fixed-point computation is linearly bounded by the size of its input.

The following novel scoring factors are used to rank the alternative parse trees based on the following attributes of a parse-tree:

Number of terminal symbols.
Number of non-terminal symbols.
The depth of the parse-tree.
The size of the gaps in the terminal symbols.
ASR-Confidence measures associated with each terminal symbol.
Context-adjustable weights associated with each terminal and non-terminal symbol.

Each path preferably corresponds to a separate topic that can be developed independently, operating on a small amount of data, in a computationally inexpensive way. The architecture of the parser 112 is flexible and modular so incorporating additional paths and grammars, for new topics, or changing heuristics for particular topics is straight forward, this also allows developing reusable components that can be shared among different systems easily.

From the foregoing it will be appreciated that the present invention provides a user friendly and rapid way of interacting with the otherwise complex electronic program guide. Through natural language conversation, the user can ask the system to find information in the program guide, and the returned information is displayed in easy to comprehend pieces. The result is a blend of information presentation, offering the ease of natural language dialog with the straight-forward presentation of on-screen display. While the invention has been described in its presently preferred form, it will be understood that the invention is capable of modification without departing from the spirit of the invention as set forth in the appended claims.

What is claimed is:

1. An information filtering system for a home network having at least one home components communicating therewith, comprising:

a speech recognizer for processing speech input;

a data store containing at least two electronic activity guides relating to different home component;

a natural language parser in communication with said speech recognizer and operable to extract semantic information from the speech input, the natural language parser having a set of grammars that correlate to contents of at least one electronic guide associated with a first home component;

a guide mapping module having access to the data store and operable to update the set of grammars with contents of an electronic activity guide associated with a second home component; and a dialog manager for filtering said electronic activity guides based on said semantic information and for providing a user with information regarding available activities in response to the user's input speech.

2. The system of claim 1 wherein said home component is selected from the group consisting of audio/video equipment, appliances, computers, home automation systems, fire alarm systems, burglar alarm systems, telephone systems, intercom systems, gateway systems and internet access systems.

3. The system of claim 1 wherein said dialog manager provides said filtered information to the user in audible or visual form.

4. The system of claim 1 further comprising a mapping module coupled to said data store for updating the contents of said data store from a source of electronic activity guide information.

5. The system of claim 1 further comprising a home gateway module that couples said network to the internet and wherein said filtering system filters information obtained via the internet based on said semantic information.

6. The system of claim 1 wherein a plurality of home components are in communication with said network and wherein said filtering system includes a plurality of electronic activity guides corresponding to said plurality of home components.

7. The system of claim 1 wherein said home component includes an associated microphone through which said user provides said input speech.

8. The system of claim 1 wherein said home component includes an associated display by which said dialog manager provides said filtered information.

9. The system of claim 1 wherein said dialog manager includes a speech synthesizer for providing the user with synthesized speech information.

10. The system of claim 1 wherein said dialog manager includes a speech synthesizer for providing the user with said filtered information as synthesized speech.

11. The system of claim 1 wherein said parser is a goal-oriented parser defining a plurality of goal-oriented frames having slots corresponding to information represented in said electronic activity guide.

12. The system of claim 1 wherein said parser is a natural language parser having a set of predefined grammars that correspond to information represented in said electronic activity guide.

13. The system of claim 4 wherein said mapping module includes a mapping module updating system for updating the functionality of said mapping module based on information obtained from a remote site.

14. The system of claim 1 wherein said dialog manager includes a user profile data store for storing a representation of a user's past use of said filtering system, and wherein said dialog manager uses said profile data store to further filter said stored electronic activity guide representation.

15. The system of claim 1 further comprising user profile data store and speaker verification system for accessing said user profile data store.

16. The system of claim 1 further comprising user profile data store and speaker identification system for accessing said user profile data store.

17. An information filtering system for use with a home network having at least one home component communicating therewith, the system comprising:

a speech recognizer having a natural language parser for extracting semantic information from a user's request, the parser comprising:
 a) a global parser operable to extract overall semantics of the user's request; and
 b) a local parser operable to provide parse hypotheses, said local parser operable according to a local parsing method, the method comprising:
  i) performing a lexical analysis;
  ii) performing parallel parse-forest generation; and
  iii) performing analysis and synthesis of parsed components;

a guide mapping module operable to construct a semantic representation of an electronic activity guide based on a source of electronic activity guide information, the electronic activity guide having available activities relating to said home component;

a stored semantic representation of the electronic activity guide, the stored semantic representation of the electronic activity guide stored in memory accessible to the natural language parser; and a dialog manager operable to filter the stored semantic representation of the electronic activity guide based on the semantic information, the dialog manager further operable to provide a user with information regarding available activities in response to the user's request.

* * * * *

UNITED STATES PATENT AND TRADEMARK OFFICE
CERTIFICATE OF CORRECTION

PATENT NO. : 6,513,006 B2
DATED : January 28, 2003
INVENTOR(S) : Howard et al.

It is certified that error appears in the above-identified patent and that said Letters Patent is hereby corrected as shown below:

<u>Title page,</u>
Item [73], Assignee, "Matsushita Electronic Industrial Co., Ltd., Osaka (JP)" should be -- Matsushita Electric Industrial Co., Ltd., Osaka (JP) --

Signed and Sealed this

Twenty-seventh Day of January, 2004

JON W. DUDAS
*Acting Director of the United States Patent and Trademark Office*